United States Patent [19]

Mäkelä

[11] 4,132,289
[45] Jan. 2, 1979

[54] LUBRICATION ARRANGEMENT FOR THE BLADE CHAIN OF A FELLING SAW

[75] Inventor: Markku Mäkelä, Tampere, Finland

[73] Assignee: Rauma-Repola Oy, Finland

[21] Appl. No.: 807,672

[22] Filed: Jun. 17, 1977

[30] Foreign Application Priority Data

Jun. 18, 1976 [FI] Finland .................................. 761780

[51] Int. Cl.² ......................... F16N 7/14; A01G 23/08
[52] U.S. Cl. .................................. 184/15 R; 30/123.4; 83/169; 418/102
[58] Field of Search ....................... 184/15 R; 418/102; 30/123.4, 381; 83/169

[56] References Cited

U.S. PATENT DOCUMENTS

| | | | |
|---|---|---|---|
| 2,316,996 | 4/1943 | Smith | 184/15 R X |
| 2,351,739 | 6/1944 | Blum | 184/15 R X |
| 2,565,250 | 8/1951 | Mahlon et al. | 418/102 X |
| 2,650,626 | 9/1953 | Kiekhaefer | 184/15 R X |
| 2,688,989 | 9/1954 | Smith | 30/123.4 |
| 3,369,461 | 2/1968 | De Biasi | 418/102 |
| 3,862,814 | 1/1975 | Swedberg | 418/102 |

FOREIGN PATENT DOCUMENTS 330460 9/1970 Sweden.
380996 11/1975 Sweden.

*Primary Examiner*—David H. Brown
*Attorney, Agent, or Firm*—Burns, Doane, Swecker & Mathis

[57] ABSTRACT

A lubrication arrangement for the blade chain of a felling saw utilizes the oil in the hydraulic system which operates the blade chain. Some of the oil flowing from a hydraulic motor to a lubricant tank is fed to the chain for lubrication purposes. The feed line includes a flow controller such as a resistance valve and a directional valve for preventing oil from flowing to the tank from the chain when the saw is not operating.

4 Claims, 1 Drawing Figure

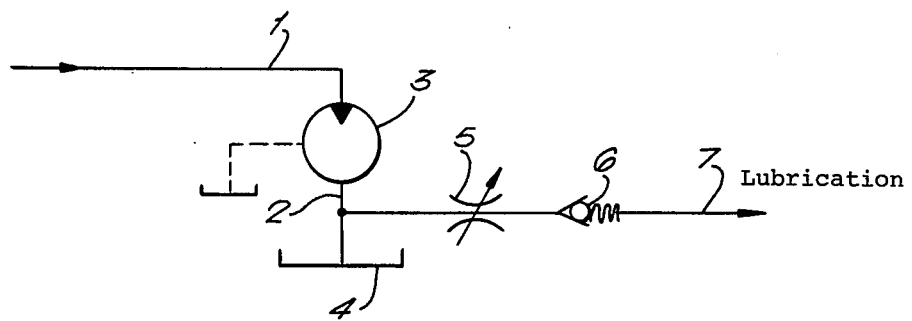

LUBRICATION ARRANGEMENT FOR THE BLADE CHAIN OF A FELLING SAW

The subject of the present invention is a lubrication arrangement for the blade chain of a felling saw.

In the tree-felling apparatuses provided with chain saws used in the present wood-harvesters and felling machines, for lubricating the blade chain it is customary to use lubrication arrangements operated by separate pumps, lubricating oil obtained from the feeding movement by means of a separate cylinder, or lubricating oil obtained from a lubricant tank pressurized by means of compressed air.

The equipment mentioned above requires separate control from the on-position of the sawing movement. Leakage oil of the hydraulic motor has also been used for lubrication, but such a lubrication is indefinite and is largely dependent on the loading and wear of the motor.

The object of the present invention is to provide an improvement of the above drawbacks, and the lubrication arrangement of the blade chain in accordance with the invention is characterized in that lubrication oil for the blade chain is arranged so as to be supplied straight from the hydraulic system operating the blade chain, from the return flow pipe system between the hydraulic motor rotating the blade chain and the lubricant tank, and that the lubrication oil channel or pipe concerned is provided with means controlling the flow of the lubricating oil, such as a resistance valve controlling the quantity of the lubricating oil as well as a counter valve or hydraulically controlled direction, pressure-restriction, or follower valve which prevents the emptying of the pipe system in a saw that is out of operation.

Since the lubrication oil comes straight from the hydraulic system of the rotation of the blade chain of the felling saw, the lubrication oil system does not require separate control.

The invention comes out more closely from the following description and from the attached drawing, wherein an exemplifying embodiment of the lubricating system in accordance with the invention is presented as a hydraulic diagram.

In the attached hydraulic diagram the pressure oil comes along pipe 1 to the hydraulic motor 3, and the return flow from the motor 3 to the tank 4 takes place along pipe 2.

When the motor 3 of the blade chain rotates, the oil flowing through the motor 3 causes a pressure in the pipe system 2 from the motor 3 to the tank 4, owing to flow losses. By means of this pressure, an oil flow 7 is obtained through the counter valve 6 and the resistance valve 5 to the lubrication of the blade chain. The purpose of the resistance valve 5 is to control the quantity of the lubricating oil. The purpose of the counter valve 6 is to prevent emptying of the pipe system 2, 7 when the motor 3 of the blade chain does not rotate and the pressure in the return pipe 2 of the motor is low. The counter valve 6 may be replaced, e.g., by a hydraulically controlled direction valve, pressure-restriction valve, or follower valve. The resistance valve 5 may be omitted if a flow of appropriate magnitude has been arranged in the counter valve 6 or in the valve substituted for same for the lubricating oil when the motor 3 of the blade chain rotates. The resistance valve 5 may be placed before or after the counter valve 6. The lubrication may also be taken from the pressure pipe 1 of the motor 3, but the system then requires a pressure compensation for the resistance valve.

What we claim is:

1. A lubricating system for a blade chain of a felling saw comprising:
    a hydraulically operated motor;
    a lubricant tank for receiving hydraulic oil from said hydraulic motor;
    return flow pipe means for conducting oil from said hydraulic motor to said lubricant tank;
    feed pipe means connected to said return flow pipe means for conducting at least some of the oil in said return flow pipe means to a blade chain; and
    valve means for inhibiting the flow of oil in said feed pipe means in a reverse direction from said feed pipe means to said lubricant tank.

2. The system of claim 1 further including flow controlling means located in said feed pipe means for controlling the quantity of oil flowing in said feed pipe means.

3. The system of claim 2 wherein said flow controlling means comprises a resistance valve.

4. The system of claim 1 wherein said valve means includes a check valve.

* * * * *